United States Patent [19]

Williams

[11] Patent Number: 4,612,910
[45] Date of Patent: Sep. 23, 1986

[54] ICE FISHING HOLE HEATER

[76] Inventor: Robert E. Williams, 1501 Milbourne, Flint, Mich. 48504

[21] Appl. No.: 769,799

[22] Filed: Aug. 26, 1985

Related U.S. Application Data

[63] Continuation of Ser. No. 652,665, Sep. 21, 1984, abandoned.

[51] Int. Cl.[4] .............................................. F24H 1/20
[52] U.S. Cl. ................................. 126/360 R; 126/367
[58] Field of Search .......... 126/271.1, 271.3, 271.2 R, 126/360 R, 360 A, 367, 368, 366; 220/231

[56] References Cited

U.S. PATENT DOCUMENTS

| | | | |
|---|---|---|---|
| 158,322 | 12/1874 | Smith | 126/367 |
| 378,512 | 2/1888 | Marshall | 126/360 R |
| 632,160 | 8/1899 | Van Alstyne | 126/367 |
| 974,060 | 10/1910 | Hebert | 126/360 R |
| 1,279,934 | 9/1918 | Subby | 126/367 |
| 1,996,098 | 4/1935 | Chase | 126/59.5 |
| 2,506,957 | 5/1950 | Gomez | 220/231 |
| 2,509,690 | 5/1950 | Martin | 126/360 R |
| 3,194,229 | 7/1965 | Borgeson | 126/360 R |
| 3,407,283 | 10/1968 | Peterson | 126/360 R |
| 3,593,647 | 7/1971 | Copeland, Jr. | 126/41 R |
| 3,807,385 | 4/1974 | Hedestrom | 126/360 R |

Primary Examiner—James C. Yeung
Attorney, Agent, or Firm—Brooks & Kushman

[57] ABSTRACT

An ice fishing hole heater comprises a housing defining an open topped cavity adapted to receive a combustible fuel source. Heater is constructed so that the specific gravity of the housing and the heat source enables the heater to be buoyantly supported in a body of water. The housing also includes ballast weight to maintain the housing in an upright position. Preferably, the housing includes a radially expanded ring which is hollow to stabilize the housing as it floats and which floats at the surface level of the body of water to radiate heat from an expanded surface area into the water in the hole.

18 Claims, 5 Drawing Figures

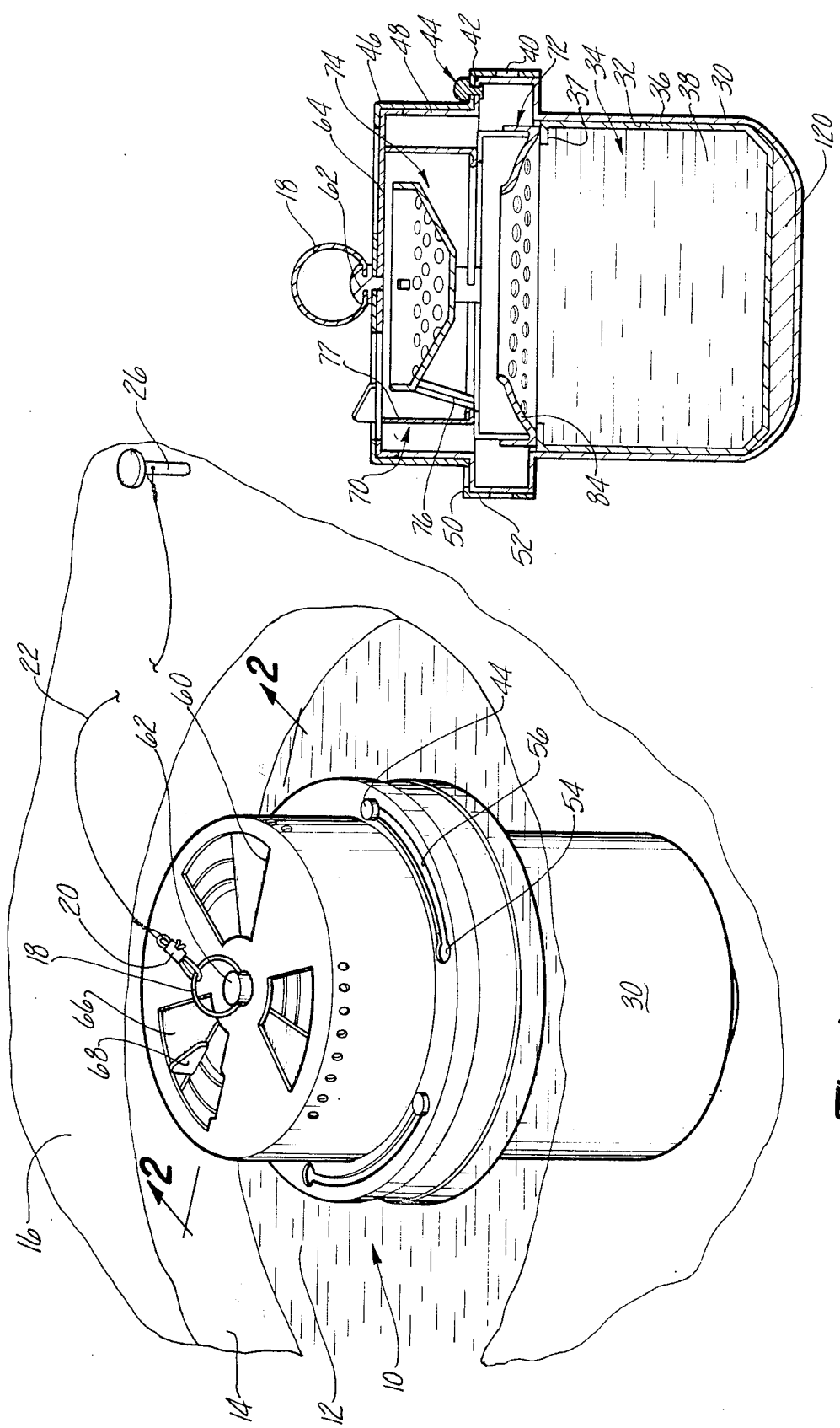

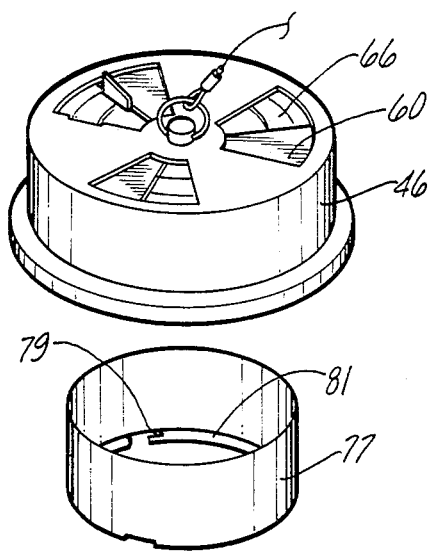
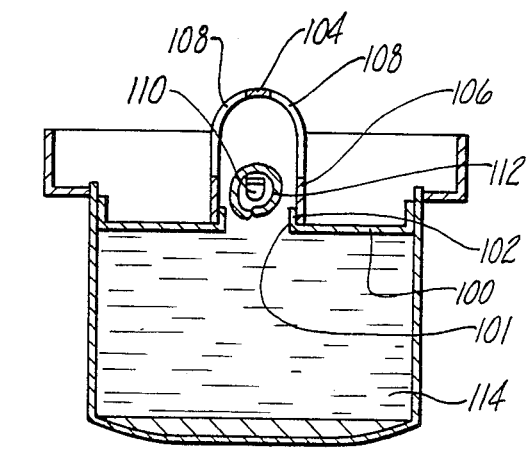
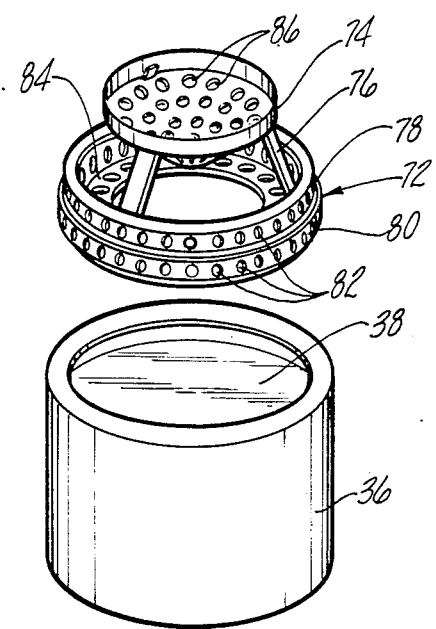
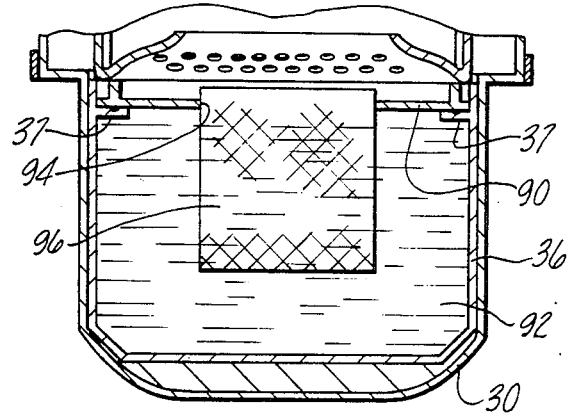
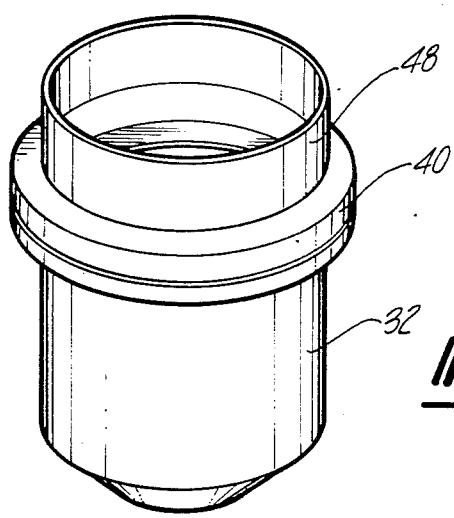
Fig-5
Fig-4
Fig-3

ICE FISHING HOLE HEATER

This application is a continuation of application Ser. No. 652,665, filed Sept. 21, 1984, now abandoned.

BACKGROUND OF THE INVENTION

I. Field of the Present Invention

The present invention relates generally to combustion heater housings and more particularly to such a heater housing adapted to float in a hole in a layer of ice extending over a body of water to radiate heat to the water in an ice fishing hole.

II. Description of the Prior Art

The layers of ice which form over lakes and other bodies of water during a winter season are advantageous in that they provide fishermen with access to desirable fishing locations without the need for a boat or a raft. Once a desirable location has been selected on an ice-over lake, the fisherman cuts a hole in the layer of ice to provide access to the lake waters below the ice. Unfortunately, the winter weather can provide extreme cold which tends to refreeze the water and cover the fishing hole even while it is being used for fishing. Accordingly, it has been found desirable to provide a means for maintaining an uncovered hole in the layer of ice covering the lake.

One previously known means for maintaining the hole in the layer of ice comprised a housing enclosure supported by the ice layer around the hole which includes apertures or doorways through which fishing line and other fishing equipment can extend through the hole in the ice. However, such housings extend up above the layer of ice and substantially restrict access to the fishing hole cut in the layer of ice.

Many of the previously known housings adapted to be supported on the ice layer include a heating means for radiating heat to the exposed water in the hole so that the hole does not freeze shut. One previously known heating means comprises a coal support tray in which hot coals can be positioned to radiate heat throughout the housing and to the hole which is covered by the housing. However, hot coals are difficult to handle, ignite and extinquish, and make use of previously known ice fishing hole heaters extremely cumbersome. Another form of heating means comprises a fluid circulation system in which heated fluid is pumped through fluid passageways in the housing walls. However, such a system is extremely complex to construct and therefore, expensive to produce. Moreover, such devices are primarily useful for removing a reformed ice plug from the fishing hole rather than preventing freezing of the hole during use.

SUMMARY OF THE PRESENT INVENTION

The present invention overcomes the above mentioned disadvantages by providing an ice fishing hole heater having a housing which is buoyantly supported in the water within a hole cut in a layer of ice for ice fishing. Since the housing is not supported by the ice layer surrounding the ice fishing hole, the housing cannot become frozen to the layer of ice and is easily removed when fishing has been completed. Moreover the ice fishing hole heater of the present invention is substantially more compact than previously known hole heater devices and is therefore substantially easier to transport and store than previously known devices. In addition, the housing does not obstruct access to the fishing hole.

The housing is adapted to contain a heating source such as a solid or liquid combustible fuel and therefore includes adjustable venting means for controlling the rate of combustion in the housing. Moreover, in the preferred embodiment of the present invention, a flame deflector controls the height of the flame and distributes the heat created by combustion throughout the housing for radiation into the surrounding water in the ice fishing hole. Preferably, the housing includes a radially enlarged hollow ring which provides a large surface area for radiation of heat into the surrounding water without unduly increasing the size of the entire housing. In any event, it is to be understood that the housing is adapted to receive various types of heat sources as will be described in further detail hereinafter.

BRIEF DESCRIPTION OF THE DRAWING

The present invention will be more clearly understood by reference to the following detailed description of the preferred embodiment of the present invention when read in conjunction with the accompanying drawing in which like reference characters refer to like parts throughout the views and in which:

FIG. 1 is a perspective view of an ice fishing hole heater according to the present invention in use;

FIG. 2 is a sectional view taken substantially along the line 2—2 in FIG. 1;

FIG. 3 is an exploded perspective view of the device shown in FIG. 1;

FIG. 4 is a sectional view of a portion of the device similar to FIG. 2 but showing a modification thereof.

FIG. 5 is a sectional view similar to FIGS. 2 and 4 which shows a further modification in accordance with the present invention.

DETAILED DESCRIPTION OF A PREFERRED EMBODIMENT OF THE PRESENT INVENTION

Referring first to FIG. 1, an ice fishing hole heater 10 according to the present invention is thereshown floating in a body of water 12 within a hole 14 cut in a layer of ice 16 extending over the body of water 12. The heater 10 is substantially smaller than the hole 14 cut in the ice and can float freely within the hole 14 when the body of water 12 is a still lake or the like. However, the position of the heater 10 within the hole 14 can be stabilized so that current in the underlying body of water or turbulence caused by insertion of lines or fishing equipment through the hole doesn't upset or cause submersion of the heater 10. A means for stabilizing the position of the heater 10 in the preferred embodiment comprises a ring 18 supported atop the heater 10 adapted to be engaged by a detachable leader clasp 20 or the like secured to one end of a leader line 22. The other end of the leader line 22 is secured through a bore in the headed spike 26 which can be driven into the layer of ice 16. Nevertheless, it will be understood that other anchoring means, such as an elongated stick or rod extending through the ring 18 and substantially longer than diameter of the hole 14, would also serve to stablize the position of the heater 10 within the hole 14.

Referring now to FIG. 2, the heater 10 according to the present invention comprises a housing 30 defining an open topped cavity 32. The cavity 32 is sized to receive a heating fuel source 34 which can be of conventional construction. For example, containers filled with solid fuel are commercially available, and are often in the form of a can having a tight fitting, removable lid. Once the lid of such containers is removed, solid fuel within the container can be ignited by a match or other flaming device placed in contact with the top surface of the fuel supply within the container. The housing 30 of the present invention is well adapted to receive such conventional containers such as the can 36 filled with combustible fuel 38 as shown in FIG. 2.

The housing 32 includes a radially expanded ring 40 defining a hollow cavity and having an upper ledge 42 provided with a plurality of mounting pins 44. The housing 32 also includes a lid 46 adapted to be received over the upper raised rim 48 of the housing and which includes a flange 50 adapted to mate with the upper ledge 42 of the housing 32 and a side flange 52. The mating flange 50 includes a plurality of apertures 54 each aperture being sized to receive the enlarged heads of a mounting stem 44, and further includes elongated slots extending circumferentially from each aperture and adapted to receive the narrow stem of the mounting pin 44. The apertures 54 are spaced apart so as to register with the positions of mounting stems 44 on the ledge 42. The close fitting engagement of the cylindrical body of the lid 46, the flange 50 and the side flange 52 with the rim 48, the ledge 42 and the side of ring 40, respectively, forms a water-tight seal between the lid 46 and housing 32.

Referring again to FIG. 1, the top or endwall of the lid 46 includes a plurality of vent openings 60 and a central aperture adapted to receive a pivot pin 62 therethrough. The pivot pin 62 rotatably supports a vent plate 64 having vent hole covering wings 66 so that the degree to which the vent holes 60 are uncovered is manually adjustable. The plate 64 includes a turned up lip 68 extending upwardly through a vent hole 60 to aid in pivoting plate 64 about the pivot pin 62. As also shown in FIG. 2, the head of the pivot pin 62 can includes pair of apertures adapted to receive the ends of the ring 18.

Still referring to FIG. 2, a flame deflector and heat radiating mechanism 70 is supported on the container 36 holding the fuel supply 38. The deflector means 70 comprises a base ring 72 and a substantially conical deflector plate 74 secured above base ring 72 by plurality of stanchions 76. The stanchions 76 also support a deflector shroud in the form of a cylindrical ring 77 radially outwardly from and coaxially with the deflector plate 74. As best shown in FIG. 3, the deflector ring 77 is detachably secured to the stanchions by slots 79 in an annular flange 81 adapted to receive the stanchions 76 therein.

As best shown in FIGS. 2 and 3, base ring 72 comprises an upper ring member 78 and a lower ring member 80. Each of the ring members 72 and 78 includes a plurality of peripheral apertures 82 in communication with the cavity enclosed by the enlarged ring 40 of the housing 32. In addition, lower ring member 80 includes a substantially annular base portion 84 adapted to rest upon the rim 37 of the fuel container 36. Furthermore, the substantially conical deflector plate 74 also includes a plurality of apertures 86 for dispersing the flame generated by ignition of the fuel supply 38.

Referring now to FIG. 4, a modified heat source for the ice fishing hole heater 10 of the present invention is thereshown comprising a previously used fuel supply container 36. When the supply container 36 has been depleted of its fuel supply 38, it will be understood that the container 36 can be replaced with a new commercially available replacement. However, the container 36 can be reused by reloading it with a substitute fuel supply. As shown in FIG. 4, the lid 90 of supply container 36 has been closed over a new liquid fuel supply 92. The substitute fuel supply can be purchased in bulk quantities for use in the ice fishing hole heater of the present invention. The lid 90 is provided with apertures 94 adapted to receive and support a woven material wick 96 which extends down into the liquid substitute fuel supply 92.

Alternatively, it should be understood that other heat sources can be employed with the ice fishing hole heater with the present invention. As shown in FIG. 5, the lower portion of the cavity 36 of the housing 32 is enclosed by a tight fitting lid 100. The lid 100 includes a central aperture 101 defined by an upwardly extending peripheral ridge 102. A dome-type wick structure 104 includes a lower edge adapted to fixedly engage the ridge 102 on the lid 100. The dome body 106 includes enlarged apertures 108, and supports a transverse wick supporting bar 110. A woven material wick 112 or the like is wrapped around the support bar 110 so as to be exposed through the aperture 101 with the supply fuel 114 enclosed within the lower portion of the cavity 36 under lid 100.

Referring now to FIGS. 2, 4 and 5, it can be seen that the bottom wall of the housing 32 supports a ballast weight 120. The ballast weight 120 can be integrally formed with the bottom wall of the housing 32 or can comprise removable weights which can be inserted or removed as desired. In either case, the ballast weight provides the desired center of gravity for the heater 10 housing so that the contents float on the body of water 12 in an upright position. Moreover, the specific gravity of the hole heater 10 permits the housing 32 to float at a level in which the enlarged ring 40 is maintained in a position where its side wall meets the surface level of the body of water 12. The height of the side wall of ring 40 permits the housing to maintain this desired position regardless of whether fuel supply is full or in near empty condition. As a result, the enlarged ring 40 continually radiates heat outwardly from the housing and into the water exposed through the hole 14 in the ice 16 when the fuel source is ignited.

In any event, it will be understood that the present invention can be readily disassembled and the fuel source or fuel supply readily exchanged or replenished. Since the ice fishing hole heater of the present invention is not supported by the ice layers surrounding the hole, it does not interfere with access to the lake through the hole. Moreover, the heater is substantially more compact and easier to use than previously known heating devices used in maintaining a hole and an ice layer on a body of water.

The heat deflecting mechanism 70 diverts any open flame caused by combustion of the fuel and prevents the flame from extending outwardly from the housing through vent holes 60. As a result, the flame is safely contained within the housing and dispersed outwardly toward the sides of the housing and into the hollow ring 40 so that the heat is effectively radiated from the housing and prevents the hole from freezing over. In addition, rotation of the plate 64 to variably open the vent holes 60 permits adjustment of the flame so that the amount of heat radiated from the heater can be adjusted for weather conditions and ambient temperature.

Moreover, the ballast weight 120 enables the housing to maintain an upright position in the water regardless of currents in the body of water or turbulence of water in the ice fishing hole. Furthermore, the hollow ring 40 provides stability to the heater as it floats in the water. In addition, the ring 40 provides a large surface area for conducting heat to the water in the hole without substantially increasing the size and bulk of the housing 32.

In addition, it will be understood that the interconnection of the parts of heat deflector means 70, and the fact that the lid 46 fits tightly against the housing 32 so as to entrain the components of the heating means therebetween, fixedly supports the heating means in its operating position even if the heater is inadvertently jostled or tipped.

Having thus described my invention, many modifications thereto will become apparent to those skilled in the art to which it pertains without departing from the scope and spirit of the present invention as defined in the appended claims.

What is claimed is:

1. An ice fishing hole heater comprising:
   a housing defining an open topped cavity,
   heating means adapted to be received in said cavity, and
   means for buoyantly supporting said housing and said heating means in a body of water in an upright position, wherein said housing includes a radially expanded ring near the upper portion of said cavity to form a means for radiating heat outwardly from said housing over an expanded surface area and wherein said ring is hollow and communicates with the interior of said housing;
   wherein said heating means comprises a fuel receptacle adapted to be received in said housing cavity and having means for generating a flame; and
   further comprising deflector means for dispersing said flame, wherein said deflector means comprises a deflector plate and means for supporting said deflector plate on said fuel receptacle, wherein said means for supporting comprises a ring adapted to engage the rim of said fuel receptacle, and wherein said ring includes a plurality of venting apertures aligned for communication with said hollow ring.

2. The invention as defined in claim 1 and further comprising a lid for covering the open topped cavity and including adjustable means for selectively venting said cavity, and further comprising means for detachably securing said lid to said housing.

3. The invention as defined in claim 1 wherein said deflector plate includes a plurality of apertures.

4. The invention is defined in claim 3 wherein said deflector plate is substantially frusto-conical and tapers radially outwardly toward the top of said housing.

5. The invention as defined in claim 1 wherein said heating means further comprises a tubular shroud peripherally enclosing but spaced radially outwardly from said deflector plate.

6. The invention as defined in claim 1 wherein said heating means comprises a fuel receptacle, at least one wick, and means for supporting said wick above said fuel receptacle so that said wick is in communication with the contents of said fuel receptacle.

7. The invention as defined in claim 1 wherein said means for buoyantly supporting said housing comprises means for buoyantly supporting said hollow ring at the surface level of water.

8. The invention as defined in claim 1 and further comprising means for anchoring said housing with respect to the ice layer surrounding the ice fishing hole.

9. The invention as defined in claim 8 wherein said anchoring means comprises a spike, and a line fixedly secured at one end with respect to said housing and secured at its other end to said spike.

10. An ice fishing hole heater comprising:
    a housing defining an open topped cavity,
    heating means adapted to be received in said cavity, and
    means for buoyantly supporting said housing and said heating means in a body of water in an upright position,
    wherein said heating means comprises a fuel receptacle adapted to be received in said housing cavity and having means for generating a flame, and further comprising deflector means for dispersing said flame wherein said deflector means comprises a deflector plate and means for supporting said deflector on said fuel receptacle, whereby said defector is wholly supported by said fuel receptacle, wherein said means for supporting said deflector plate comprises an annular rim on said fuel receptacle and wherein said deflector includes an annular ring having a substantially annular base portion adapted to mate with and rest upon said annular rim.

11. The invention as defined in claim 10 wherein said support ring includes a plurality of venting apertures.

12. The invention as defined in claim 11 where said apertures in said support ring are aligned with said hollow ring.

13. The invention as defined in claim 10 and further comprising a lid for covering the open topped cavity and including adjustable means for selectively venting said cavity, and further comprising means for detachably securing said lid to said housing.

14. The invention as defined in claim 10 wherein said deflector plate includes a plurality of apertures.

15. The invention as defined in claim 14 wherein said deflector plate is substantially frusto-conical and tapers radially outward toward the top of said housing.

16. The invention as defined in claim 10 wherein said heating means comprises a fuel receptacle, at least one wick, and means for supporting said wick above said fuel receptacle so that said wick is in communication with the contents of said fuel receptacle.

17. The invention as defined in claim 10 and further comprising means for anchoring said housing with respect to the ice layer surrounding the ice fishing hole.

18. The invention as defined in claim 10 and further comprising:
    a lid comprising a cylindrical body having an endwall with at least one vent hole for covering the open topped cavity and including adjustable means for selectively venting said cavity through said vent hole, and further comprising means for detachably securing said lid to said housing, wherein said means for selectively venting comprises a plate having at least one vent hole covering wing and means for rotatably mounting said plate to said endwall.

* * * * *

UNITED STATES PATENT AND TRADEMARK OFFICE
CERTIFICATE OF CORRECTION

PATENT NO. : 4,612,910
DATED : September 23, 1986
INVENTOR(S) : Robert E. Williams It is certified that error appears in the above-identified patent and that said Letters Patent is hereby corrected as shown below:

Column 1, Line 20,             "ice-over" should be --iced-over--

Column 5, Line 52, Claim 4,  "is" should be --as--;

Column 6, Line 33, Claim 12, "where" should be --wherein--.

Signed and Sealed this
Sixteenth Day of December, 1986

*Attest:*

DONALD J. QUIGG

*Attesting Officer*      *Commissioner of Patents and Trademarks*